United States Patent [19]
Hallikainen

[11] Patent Number: 5,627,769
[45] Date of Patent: May 6, 1997

[54] METHOD AND CONTROL SYSTEM FOR CONTROLLING A FLUID COMPRESSION SYSTEM

[75] Inventor: Keijo Hallikainen, Helsinki, Finland

[73] Assignee: Sarlin-Hydor Oy, Helsinki, Finland

[21] Appl. No.: 376,418

[22] Filed: Jan. 23, 1995

[30] Foreign Application Priority Data

Nov. 24, 1994 [FI] Finland ................... 945526

[51] Int. Cl.⁶ ............................................. G01N 7/00
[52] U.S. Cl. ........................................ 364/558; 364/509
[58] Field of Search .................................. 364/509, 510, 364/500–503, 494; 558, 431.02; 62/83, 176.3, 191–196.3, 215, 226, 226.1, 226.5, 401; 96/127, 128; 415/12, 15, 17; 417/19, 20

[56] References Cited

U.S. PATENT DOCUMENTS

| | | | |
|---|---|---|---|
| 3,731,071 | 5/1973 | White et al. | 235/151.12 |
| 4,156,578 | 5/1979 | Agar et al. | 415/17 |
| 4,361,417 | 11/1982 | Suzuki . | |
| 4,949,276 | 8/1990 | Staroselsky et al. | 364/509 |
| 5,054,995 | 10/1991 | Haseley et al. | 415/17 |
| 5,306,116 | 4/1994 | Gunn et al. | 415/17 |

FOREIGN PATENT DOCUMENTS

| | | |
|---|---|---|
| 3022062 | 12/1980 | Germany . |
| 3213155 | 8/1982 | Germany . |
| WO91/06762 | 5/1991 | WIPO . |

Primary Examiner—James P. Trammell

[57] ABSTRACT

A method of controlling a fluid compression system having at least one compressor for compressing a fluid medium includes defining the permissible minimum and maximum values of the user line pressure at the point of demand. The user line pressure is continuously monitored using a pressure sensor, and the working pressure of the compressor is monitored. The pressure difference between the working pressure of the compressor and the user line pressure at the point of demand is monitored. The pressure rate-of-change of the fluid medium delivered to the point of demand is monitored, and at least one of the compressors is controlled by a control unit on the basis of at least one of the monitored parameters defined in the foregoing steps of the method. A control system for controlling the operation of at least one compressor uses a plurality of sensors for sensing the status of the flowing medium.

12 Claims, 1 Drawing Sheet

5,627,769

METHOD AND CONTROL SYSTEM FOR CONTROLLING A FLUID COMPRESSION SYSTEM

BACKGROUND OF THE INVENTION

1. Field of the Invention

The present invention relates to a method 1 for controlling a fluid compression system. The invention also concerns a control system suited for controlling a fluid compression system.

2. Description of the Prior Art

In conventional compression systems of a fluid medium, particularly compressed-air systems, the outlet pressure of the compressor is sensed, and this information is used to control the compressor operation with the help of a pressostat placed immediately at the compressor outlet. In compressor models equipped with a no-load unloading facility, the duration of the unloaded no-load running mode can be controlled by an adjustable timer. The set time is always constant until changed manually. Such control schemes are not capable of taking into account pressure losses caused by air consuming equipment attached to the system and variations in compressed air demand. Pressure loss occurring in the equipment is entirely dependent on instantaneous air flow rate and pressure. These variables may change by a large amount within a short interval of time. Moreover, the pressure loss caused by filters on the compressed-air line is dependent on the degree of clogging of the filters. When new, the filter causes a small pressure loss which increases with the clogging of the filter when it binds impurities from the through-flowing air. When sufficiently clogged, the filter element is replaced, whereby the pressure loss is again reduced to a low level.

To the user of the compressed-air system, it is extremely important that proper pressure level for the compressed-air operated equipment is ensured at the point of demand.

A disadvantage of prior-art equipment is that they require the compressor working pressure to be set to an unnecessarily high level due to the incapability of such equipment to compensate for the pressure losses caused by the above-mentioned accessories or devices. Resultingly, the energy consumption of the compressed-air system is unnecessarily high. Moreover, for compressors operated with period of unloaded postrunning mode, the duration of the postrunning mode is set according to the rule that the frequency of compressor starts may not exceed the maximum frequency of starts specified for the drive motor. This duration of the postrunning mode is fixed and unrelated to variations in compressed-air demand, thus permitting the compressor to run unloaded for the preset duration of the postrunning mode even during times of no compressed air demand. In this case, unnecessary energy losses occur.

Also in conjunction with compressed-air systems having two or more compressors, control systems based on conventional techniques cause superfluous energy consumption. Very commonly a pressure swing of small amplitude or short duration starts the second or the other compressors even when no extra air would actually be required. Further, if the compressor is operated using an unloaded no-load running mode, the proportion of useless energy consumption may rise up to about 40% of the nominal electrical input rating of the compressor yet producing no air to the compressed-air network.

Energy consumption in conventional compressed-air systems is on the average more than 30% greater than the theoretical minimum due to the following reasons:

To fulfill the pressure requirements of the user equipment under varying conditions of air demand, the compressor working pressure must be set significantly higher than the average pressure demand;

The compressor operating control system by no means takes into account the effect of the amount of air demand and the degree of filter contamination on pressure losses occurring in the compressed-air circuit;

The duration of the postrunning mode of the compressor intended to protect the drive motor is constant, thus failing to adjust the actually needed duration of the postrunning mode according to the variations in air demand; and Multiple compressor systems are unnecessarily sensitive, and entirely useless compressor starts are triggered which are caused by the delay from the compressor start to the instant of effective compressed air production.

SUMMARY OF THE INVENTION

It is an object of the present invention to achieve an entirely novel control method and control system for a fluid compression system, whereby the drawbacks of the prior art are overcome.

The embodiment disclosed herein provides several significant benefits. Savings in excess of 30% over conventional techniques will be achieved in the energy consumption of compressed-air production. The control scheme according to the invention provides continuous and automatic control of compressor operation in a manner that minimizes energy consumption. In multiple compressor systems the control scheme according to the invention stops and starts the compressors automatically and in an anticipatory manner so as to keep the pressure level at the point of air demand within predetermined limits and to prevent exceeding the maximum starting frequency permitted for the drive motors of the compressors. The user line pressure can be maintained within predetermined limits also under varying rates of air demand, while unnecessary running of the compressors is avoided. The control scheme according to the invention is easily adjustable to comply with local operating conditions. The system reacts immediately to changes in compressed air demand. The control system according to the invention is also capable of compensating for slow changes in pressure losses due to clogging of filters, for example.

The invention is well suited for use in different environments. It can be adapted to single as well as multiple compressor systems. In can be used in conjunction with the most common air compressor types and other fluid compression means. Further, it may be installed in both new and old compressed-air systems. The control system according to the invention comprises a modest number of components and its installation is straightforward. Connections to the compressed-air system are limited to two pressure sensors and an electrical connection to the existing control system of the compressor(s).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
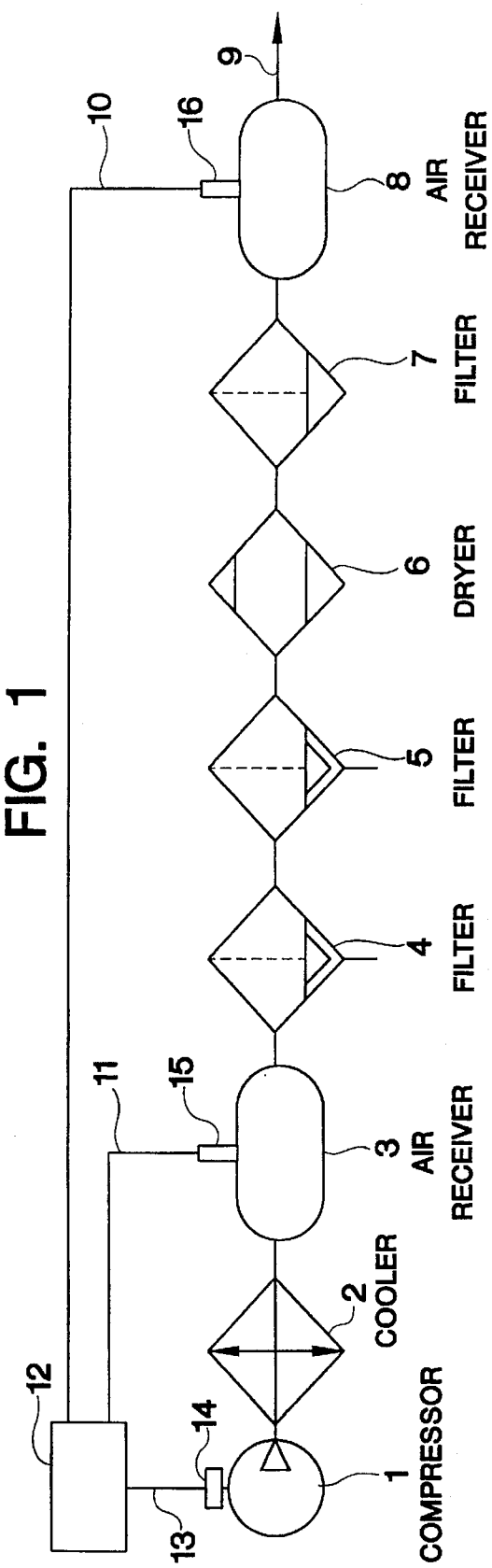
FIG. 1 is a schematic representation of the system configuration according to the invention.

With reference to FIG. 1, a compressed-air system equipped with the control system according to the invention is shown. Connected to a compressor 1 in the system is a cooler 2 and an air receiver 3, or alternatively, an expanded section of the pressure line or equivalent air storage. These elements are followed by a post-conditioning outfit 4, 5, 6, 7. Depending on the system configuration, the post-conditioning outfit includes different kinds of accessories. With reference to FIG. 1, the post-conditioning accessories include filters 4, 5 equipped with water separators, a dryer 6 and a filter 7. The post-conditioning outfit in the piping is followed by a second air receiver 8 from which air is taken to a point of demand 9.

The control system of the compressor 1 comprises a control unit 12 and two pressure sensors 15, 16, of which the first pressure sensor 15 is placed on the first air receiver 3 preceding the post-conditioning outfit 4, 5, 6, 7 and the second pressure sensor 16 is placed on the second air receiver 8 following the post-conditioning outfit. Additionally, the control system includes cabling 10, 11 connecting the control unit 12 to the pressure sensors 15, 16 as well as cabling 13 connecting the control unit 12 to the local operating control system 14 of the compressor 1. Obviously, such cabling may be replaced by any suitable signal transmission means.

The control unit 12 advantageously comprises a programmable logic controller or similar centralized control means with required accessories and connectors, as well as compressor selector switches implemented in a conventional manner for the manual operation and operating status monitoring of the compressors, indicator lamps, pushbuttons, connections for remote supervision and external display panels, etc. The programming of the logic controller in the control unit 12 is most appropriately performed using a separate programming device suited for storing in the programmable logic controller the basic data of the compressed air system such as the total volume of air receivers in the circuit, desired pressure level $P_3$ after the post-conditioning outfit, maximum permissible starting frequency for the drive motor, permissible pressure limits and other information necessary for the function of the control system.

In the method according to the invention, the pressure of compressed air delivered to the point of demand 9 is allowed to vary between a permissible minimum pressure $P_{3min}$ and a permissible maximum pressure $P_{3max}$ (whereby the maximum pressure $P_{3max}$ − minimum permissible pressure $P_{3min}$ maximum permissible pressure deviation). The pressure $P_3$ delivered to the point of demand is monitored by means of the pressure sensor 16. The pressure loss between the first air receiver 3 and the second air receiver 8 due to the outfit 4, 5, 6, 7 connected between them is dependent on the air flow rate, degree of filter clogging and the pressure prevailing in these elements. In practice, the pressure measured by means of the pressure sensor 15 is equal to the working pressure $P_2$ of the compressor. This pressure may be any level between the minimum pressure $P_{2min}$ and a maximum pressure $P_{2max}$ permitted for the operation of the compressor.

When the pressure $P_3$ measured by means of the pressure sensor 16 reaches either the preset minimum pressure $P_{3min}$ or the preset maximum pressure $P_{3max}$, the control unit 12 controls the working pressure $P_2$ of the compressor according to rules expressed below in preset pressure steps either higher or lower depending on which pressure limit is reached and how the post-conditioning accessories between the receivers 3 and 8 affect the pressure level.

The rate-of-change (rate-of-rise or rate-of-fall) of compressed air pressure delivered to the point of demand 9 is monitored continuously. The signal for the rate-of-change monitoring is most conveniently obtained from the pressure sensor 15, whereby also the effect of the post-conditioning outfit placed on the pipe between the receivers 3 and 8 is taken into account.

When the compressor 1 is running in the unloaded mode and the pressure rate-of-fall is slow, or alternatively, when the pressure is rising and the permissible starting frequency of the compressor drive motor is not exceeded, compressor 1 is stopped immediately.

Fast rate-of-fall of the pressure $P_3$ causes removal of unloading or start of a compressor before the preset lower pressure limit $P_{3min}$ is attained.

Compressor unloading/stop/start steps are predictively controlled on the basis of pressure rate-of-rise or rate-of-fall.

In systems of two or more compressors, only a single permissible pressure range from $P_{3min}$ to $P_{3max}$ need to be preset from the point of demand 9, after which the start/unloading/unloaded postrunning/stop modes of the compressors are controlled on the basis of the pressure rate-of-rise or rate-of-fall detected with the help of the pressure sensor 15.

The control scheme according to the invention avoids exceeding the maximum permissible start frequency specified for the drive motors of the compressors. At the onset of a possible equipment malfunction, the local control system 14 of any compressor 1 can overtake the control. The working pressure $P_2$ of the compressor is always kept at the lowest possible level which can maintain the pressure $P_3$ at the point of demand within the preset limits. In compressed air systems of multiple compressors, only the minimum number of compressors is run loaded. The method according to the invention optimizes energy consumption in a system of on arbitrary number of compressors. The system energy consumption will be the lowest possible under varying conditions of compressed air demand.

Figure 3:
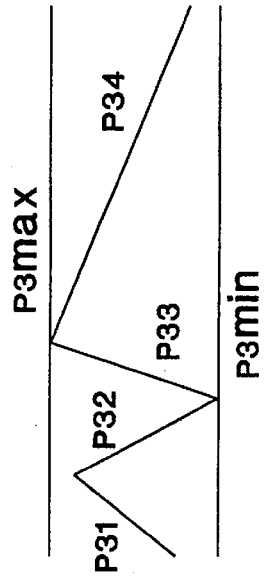
FIG. 3 is a graph illustrating the user site pressure measured at air receiver 8 of FIG. 1.

In the following the details of the invention are elucidated with reference to FIGS. 2 and 3. Pressure $P_3$ at the point of demand 9 and its permissible limits $P_{3max}$ and $P_{3min}$ are shown in FIG. 3. The working pressure $P_2$ of the compressor 1 is dependent on the instantaneous air demand situation due to the fact that the accessories 4–7 cause a pressure loss which further is dependent on the dimensioning of the accessories, instantaneous air flow rate, degree of contamination, pressure and temperature prevailing in the accessories and possible internal air consumption (particularly in adsorption dryers). Consequently, the compressor working pressure $P_2$ varies continuously. The level of the compressor working pressure $P_2$ may be affected by increasing or decreasing the compressed air delivery rate. Such changes of delivery capacity can be effected by unloading the compressor(s), stopping the compressor(s) or removing compressor unloading and starting a compressor. The working pressure $P_2$ of the compressor is not constant herein, but rather, always as low as possible, whereby the lowest possible energy consumption is achieved. The control unit 12 does not primarily monitor the absolute value of the pressure $P_2$, but only the changes of the pressure level.

Figure 2:
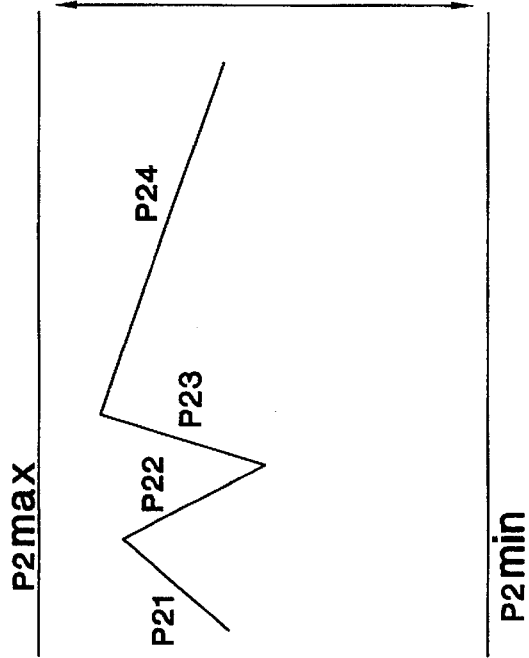
FIG. 2 is a graph illustrating the working pressure of the compressor measured at air receiver 3 of FIG. 1.

With reference to FIGS. 2 and 3, a graph is shown illustrating the different operating situations and the function of the invention under different pressure change situations.

When air consumption at the point of demand 9 begins to increase, a pressure fall $P_{32}$ occurs in the line pressure. The pressure sensor 16 signals the pressure fall to the control unit 12 and the control unit aims to control an increase in the working pressure $P_2$. Simultaneously, the resulting increase in the flow rate through the accessories 4-7 causes a higher pressure drop which requires a further increase in the working pressure $P_2$. If no increase is detected in the working pressure $P_2$, the control unit 12 finds the air delivery capacity insufficient and removes unloading of the compressor 1 or starts the next compressor to increase the delivery capacity.

An increase in air delivery capacity results in an increase in the working pressure $P_2$ (indicated by pressure phase $P_{21}$ in FIG. 2). With the increase in the flow rate, also the pressure drop through the accessories 4-7 increases. In maintaining a balance between the delivery and demand of compressed air, the line pressure $P_3$ (indicated by pressure phase $P_{31}$ in FIG. 3) varies between the limits $P_{3min}$ and $P_{3max}$. Then, the compressors are run under steady-state conditions.

At a very rapid fall of the line pressure $P_3$ (indicated by pressure phase $P_{32}$ in FIG. 3), the control unit 12 computes from the rate-of-change of the working pressure $P_2$ (indicated by pressure phase $P_{22}$ in FIG. 2) the instant when line pressure will fall below the minimum permissible pressure $P_{3min}$, and to anticipate this, removes unloading of the compressor 1 or starts the next compressor in advance so that the starting delays of the compressors or removal delays of unloading will not result in line pressure drop below the lower limit $P_{3min}$. The control unit contains data of starting and unloading removal delays of the compressors, and the stored compressor delivery capacity data can be complemented with information on receiver capacity.

When air consumption at the point of demand 9 begins to decrease and the compressor(s) is/are still running, the line pressure $P_3$ (indicated by pressure rise $P_{33}$ in FIG. 3) begins to rise. The pressure sensor 16 signals the rise of the pressure $P_3$ to the control unit, and as the line pressure tends to approach the preset permissible upper limit $P_{3max}$, the control unit 12 aims to control a decrease in the working pressure $P_2$ (resulting in a pressure fall $P_{23}$ in FIG. 2). To accomplish this, the control unit controls the compressor to run unloaded or stops the compressor(s) in a preset sequence until such an equilibrium state is attained that keeps the line pressure $P_3$ within the preset limits (indicated by pressure $P_{31}$ in FIG. 3).

If the air consumption at the point of demand 9 is very small and the line pressure $P_3$ has already reached the upper limit $P_{3max}$ and the compressor(s) has/have controlled to run unloaded, the control program computes on the basis of the stored basic data the instant at which the line pressure $P_3$ ($P_{34}$ in FIG. 3) or the compressor working pressure $P_2$ ($P_{24}$ in FIG. 2) will fall to the permissible minimum pressure $P_{3min}$. If this pressure fall time is found to become longer than the minimum stop time permitted by the highest permissible starting frequency of the compressor drive motor, the control unit 12 stops the compressor immediately and thus saves energy by avoiding unnecessary no-load running of the compressor.

If the compressor working pressure $P_2$ monitored with the help of the pressure sensor 15 rises up to its upper permissible limit $P_{2max}$, no more compressor(s) will be started by the control unit 12 notwithstanding the possibility that the user line pressure $P_3$ would be at its lower permissible limit, but instead the control unit issues an alarm of working pressure upper limit violation and/or simultaneously stops/unloads the compressor(s) presently running. This function is a safety measure protecting the compressor(s) from overload.

In the case where the compressor working pressure $P_2$ monitored with the help of the pressure sensor 15 falls to its lower permissible limit $P_{2min}$, depending on the conditions the control unit 12 may issue an alarm of exceeded capacity of the compressor(s).

In the case where a malfunction of the control unit 12 occurs and the compressor working pressure $P_2$ exceeds its upper permissible limit $P_{2max}$, system control will be directly transferred to the local control unit 14 of the compressor 1 which is adjusted to keep the working pressure of the compressor marginally above $P_{2max}$. Also this function is a safety measure.

All the foregoing functions occur automatically in the above-described or any arbitrary sequence as required by the air consumption at the point of demand 9 and the compressor working pressure $P_2$ which directly control the functions. Because the air consumption at the point of demand 9 and the running status of the compressor 1 directly affect the user line pressure which is monitored immediately after the post-conditioning accessories 4-7 with the help of the pressure sensor 16, the above-described control method makes it possible to minimize energy consumption by keeping the user line pressure $P_3$ close to its permissible minimum value and by anticipating the required unloadings and starts/stops of the compressors and by allowing the compressor working pressure $P_2$ to freely float at the level required by the instantaneous demand of compressed air and prevailing operational conditions of the equipment.

The control unit 12 can be linked by conventional means to a remote supervisory system of the compressor station.

Further, the control system can be integrated as a part of the local control equipment of the compressor, or alternatively, it can be designed to replace conventionally employed control systems of compressors.

In compressor installations of two or more compressors, the control unit can be programmed to automatically select the compressor optimally suited to produce compressed air under the instantaneous operating situation.

To those versed in the art it is obvious that the invention is not limited by the exemplifying embodiments described above, but rather, can be varied within the scope of the invention defined in the appended claims.

I claim:

1. A method of controlling a fluid compression system, said fluid compression system comprising compression means for compressing a fluid medium to form a compressed fluid medium, means for delivering said compressed fluid medium to a point of demand, and conditioning means for conditioning said compressed fluid medium located between said compression means and the point of demand, the method including the following steps:

defining permissible minimum and maximum pressure values of user line pressure at the point of demand;

utilizing a first pressure sensor to measure a working pressure of the compression means;

utilizing a second pressure sensor to measure the user line pressure;

continuously monitoring the user line pressure;

monitoring the working pressure of said compression means;

monitoring a pressure difference between the working pressure of said compression means and the user line pressure at the point of demand;

monitoring the pressure rate-of-change of the user line pressure at the point of demand; and utilizing a control unit to control the compression means on the basis of at least one of the monitored parameters defined in the foregoing steps of the method.

2. The method as defined in claim 1, including the step of controlling the working pressure of said compression means in preset steps to a higher or lower value when the user line pressure at the point of demand reaches the permissible minimum or maximum pressure value, respectively.

3. The method as defined in claim 1, including the step of controlling said compression means in an anticipatory manner by controlling said compression means by stopping or starting at least a portion of said compression means.

4. The method as defined in claim 1, including the step of controlling said compression means in an anticipatory manner by controlling said compression means by setting said compression means to an unloaded running mode.

5. The method as defined in claim 1, including the step of controlling said compression means in an anticipatory manner by controlling said compression means by setting said compression means to an unloaded postrunning mode.

6. The method as defined in claim 1, including the step of controlling said compression means in a manner that keeps the working pressure of the compression means at the lowest possible level which still can maintain the user line pressure at the point of demand within the preset permissible minimum and maximum pressure values.

7. The method as defined in claim 1, including the step of defining additional parameters including volumes of air receivers in the fluid compression system, maximum permissible starting frequency for a drive motor of the compression means, and permissible pressure limits.

8. The method as defined in claim 1, including the step of controlling said compression means by the control unit on the basis of said pressure rate-of-change at the point of demand.

9. A control system for controlling a fluid compression system, said fluid compression system comprising compression means for compressing a fluid medium to form a compressed fluid medium, means for delivering said compressed fluid medium to a point of demand, and conditioning means for conditioning said compressed fluid medium located between said compression means and the point of demand, the control system including:

first pressure sensor means located between said compression means and said conditioning means for sensing the pressure of the compressed fluid medium between said compression means and said conditioning means;

second pressure sensor means for sensing the pressure of the compressed fluid medium at the point of demand; and a control unit connected to each of said first and said second pressure sensor means, said control unit being further connected to an operating control system of said compression means, said control unit including means for determining a rate of change of pressure sensed by the second pressure sensor means and means for controlling said compression means based on said rate of change of pressure.

10. The control system as defined in claim 9, wherein said first pressure sensor means is adapted to sense pressure in a first air storage tank, and said second pressure sensor means is adapted to sense pressure in a second air storage tank.

11. The control system as defined in claim 9, wherein said pressure sensor means include pressure sensors.

12. The control system as defined in claim 9, wherein said control unit comprises a programmable logic controller.

* * * * *